United States Patent
Doyle et al.

(10) Patent No.: US 7,068,756 B2
(45) Date of Patent: Jun. 27, 2006

(54) MULTI-INTERFACE TELEPHONY TEST SYSTEM USING SEPARATE INTERFACE CARDS

(75) Inventors: John D. Doyle, Hollis, NH (US); Lawrence J. Smith, Hollis, NH (US)

(73) Assignee: Empirix Inc., Bedford, MA (US)

( * ) Notice: Subject to any disclaimer, the term of this patent is extended or adjusted under 35 U.S.C. 154(b) by 409 days.

(21) Appl. No.: 09/981,001

(22) Filed: Oct. 17, 2001

(65) Prior Publication Data

US 2002/0046302 A1    Apr. 18, 2002

Related U.S. Application Data

(60) Provisional application No. 60/241,537, filed on Oct. 18, 2000.

(51) Int. Cl.
*H04M 1/24*    (2006.01)
*H04M 3/08*    (2006.01)
*H04M 3/22*    (2006.01)

(52) U.S. Cl. ............... 379/21; 379/399.01; 379/399.02; 379/413.04; 370/463

(58) Field of Classification Search ............ 379/88.07, 379/88.13, 93.05, 399.02, 413.02, 413.04, 379/399.01, 21, 22.05, 22.06, 26.1, 26.2; 370/241, 442, 410, 463
See application file for complete search history.

(56) References Cited

U.S. PATENT DOCUMENTS

| | | | |
|---|---|---|---|
| 4,942,534 A * | 7/1990 | Yokoyama et al. ............ 700/9 |
| 5,313,211 A * | 5/1994 | Tokuda et al. ................ 342/50 |
| 5,497,373 A * | 3/1996 | Hulen et al. ................. 370/259 |
| 5,596,569 A * | 1/1997 | Madonna et al. ........... 370/217 |
| 5,771,232 A | 6/1998 | Sinibaldi et al. ............ 370/384 |
| 5,793,415 A * | 8/1998 | Gregory et al. ............ 348/14.1 |
| 5,835,566 A * | 11/1998 | Cowgill .................... 379/15.01 |
| 5,946,303 A * | 8/1999 | Watson et al. ............... 370/254 |
| 6,088,749 A | 7/2000 | Hebert et al. ............... 710/105 |
| 6,222,832 B1 * | 4/2001 | Proctor ....................... 370/335 |
| 6,249,527 B1 | 6/2001 | Verthein et al. ............ 370/466 |
| 6,279,124 B1 * | 8/2001 | Brouwer et al. .............. 714/38 |
| 6,343,086 B1 * | 1/2002 | Katz et al. .................. 370/489 |
| 6,370,155 B1 * | 4/2002 | Cantwell et al. ............ 370/465 |

(Continued)

*Primary Examiner*—Duc Nguyen
*Assistant Examiner*—Tuan Pham
(74) *Attorney, Agent, or Firm*—Chapin IP Law, LLC; David W. Rouille, Esq.; Barry W. Chapin, Esq.

(57) ABSTRACT

The present invention provides a method to configure the hardware and software resources in a system to utilize two physical interface boards in pairs such that their aggregate units of voice processing DSP resources can be applied to either all of a T1 board's physical interfaces or all of an E1 board's physical interfaces. This allows a single telecommunications system to run as either T1 or E1 with no additional hardware required. The present invention also provides the ability to run protocols normally associated with T1 physical interfaces on a card with only E1 physical interfaces. A method for changing the configuration from T1 to E1 and from E1 to T1 is provided as well. Additionally, the method includes configuring the system to look like a single set of contiguous T1 or E1 channels. Additionally, the method allows for monitoring audio by switching the Pulse Code Modulated (PCM) audio streams from/to an audio enabled resource board and switching between listening to Mu-law encoded audio for T1 and A-law encoded audio for E1. The present invention also permits the system to be cabled as T1 and E1 at the same time.

10 Claims, 2 Drawing Sheets

U.S. PATENT DOCUMENTS

| | | |
|---|---|---|
| 6,425,100 B1 * | 7/2002 | Bhattacharya ............... 714/724 |
| 6,516,053 B1 * | 2/2003 | Ryan et al. .................... 379/21 |
| 6,584,122 B1 * | 6/2003 | Matthews et al. .......... 370/493 |
| 6,603,757 B1 * | 8/2003 | Locascio .................... 370/352 |
| 6,618,374 B1 * | 9/2003 | Buckland et al. ........... 370/394 |
| 6,662,211 B1 * | 12/2003 | Weller ........................ 709/204 |
| 6,738,454 B1 * | 5/2004 | Mohammadian et al. ..... 379/21 |
| 6,744,758 B1 * | 6/2004 | Pickett ........................ 370/352 |
| 6,778,503 B1 * | 8/2004 | Sproat et al. ................ 370/247 |
| 2002/0021710 A1 * | 2/2002 | Bold et al. ................... 370/442 |

* cited by examiner

MULTI-INTERFACE TELEPHONY TEST SYSTEM USING SEPARATE INTERFACE CARDS

CROSS REFERENCE TO RELATED APPLICATIONS

This application claims priority under 35 U.S.C. §119(e) to provisional patent application Ser. No. 60/241,537 filed Oct. 18, 2000; the disclosure of which is incorporated herein by reference.

BACKGROUND OF THE INVENTION

T1 and E1 are interfaces for telecommunications channels. T1 comprises the North American format for digital transmission of data. T1 supports data rates of 1.554 Mbits per second. A T1 line comprises 24 individual channels, each supporting 64 Kbits per second. Each channel of a T1 line can be configured to carry either voice or data traffic.

E1 is similar to T1, except that E1 is the European format for digital transmission. E1 supports data rates at 2.048 Mbits per second. An E1 line comprises 32 channels at 64K bits per second each. Similar to T1, E1 can be configured to carry either voice or data traffic.

Prior to the present invention there has not been a telecommunication test system capable of running both T1 and E1 interfaces with a single set of voice channel resource cards. There are T1/E1 switchable test systems, however these systems included cards which had switchable framers and separate DSP resource cards. Previously, it was necessary to utilize a full set of T1 resource cards for testing T1 interfaces and a full set of E1 resource cards for testing E1 interfaces, all in a single system. One of the reasons for this is that T1 and E1 have different electrical interfaces so providing a solution would require a hardware based enhancement as the capability is not software programmable.

Alternatives to the present invention include duplicating the voice resources on both T1 and E1 Physical interface boards. This would result in using twice the number of boards or twice the number of systems to get the same number of channels. This method would prove to be costly to implement. Another alternative would involve modifying the system to use the physical interfaces without allocating full voice channel DSP resources. This method would provide a less flexible and capable test system. A further alternative would be to design a new board with a programmable part to accomplish the T1/E1 interface swapping. This method would be proprietary, slow, and expensive. Yet another alternative would be to physically swap boards in and out of the test system when needed. This method would also be expensive as well as prone to error, and would require manual labor by the customer. Still another alternative involves utilizing an external switch simulator that can convert T1 to E1 and vice versa. This method is expensive and impractical. In view of the above, it would be desirable to provide a multi-interface telephony test system using separate interface cards.

SUMMARY OF THE INVENTION

With the foregoing background in mind, it is an object of the present invention to configure the hardware and software resources in a system to utilize two physical interface boards in pairs such that their aggregate units of voice processing DSP resources can be applied to either all of a T1 board's physical interfaces or all of an E1 board's physical interfaces. This allows a single telecommunications system to run as either T1 or E1 with no additional hardware required.

The present invention also requires the ability to run protocols normally associated with T1 physical interfaces on a card with only E1 physical interfaces. It was further required that a method for changing the configuration from T1 to E1 and from E1 to T1 be provided as well. Additionally, a method for configuring the system to look like a single set of contiguous T1 or E1 channels was developed, when in fact the hardware resources are not contiguous.

It was also desirable to provide a method for monitoring audio by switching the Pulse Code Modulated (PCM) audio streams from/to an audio enabled resource board and switching between listening to Mu-law encoded audio for T1 and A-law encoded audio for E1. The present invention also permits the system to be cabled as T1 and E1 at the same time.

BRIEF DESCRIPTION OF THE DRAWINGS

The invention will be better understood by reference to the following more detailed description and accompanying drawings in which.

DETAILED DESCRIPTION

In a particular embodiment, the resource card in the telecommunication test system has four physical and electrical interfaces for T1 or E1 (for a total of 96 voice channels or 120 voice channels). However, the resource card has only enough voice resources to run two physical interfaces (for a total of 48 or 60 simultaneous voice channels). Accordingly, two of the physical interfaces are disabled and left idle.

In order to provide a multi-interface telephony test system it was necessary to perform several modifications to an existing system. In particular, the DSP resources from one card had to be shared with another card.

Figure 1:
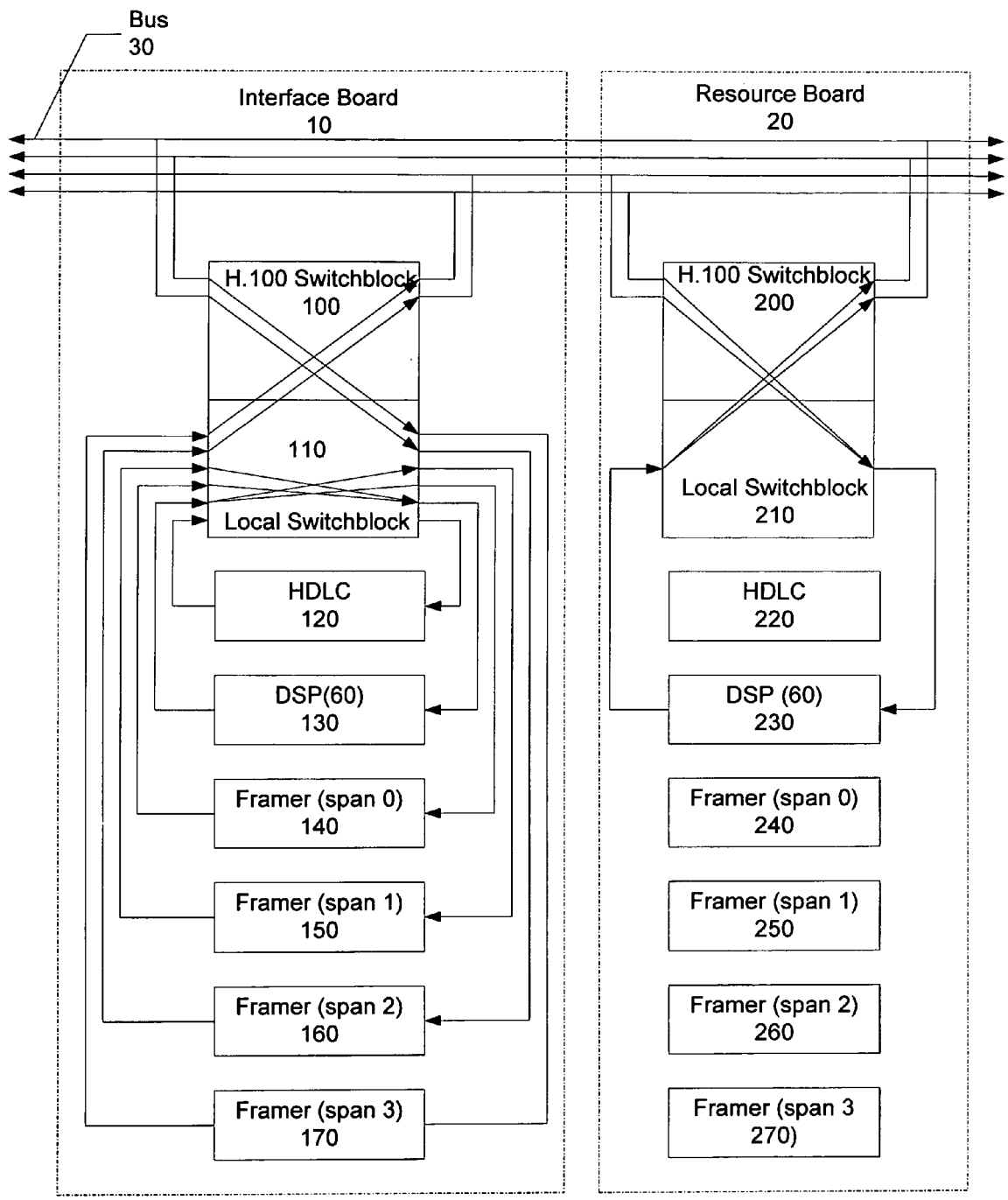
FIG. 1 is a block diagram showing the switching configuration of an interface board and a resource board according to the present invention.
Figure 2:
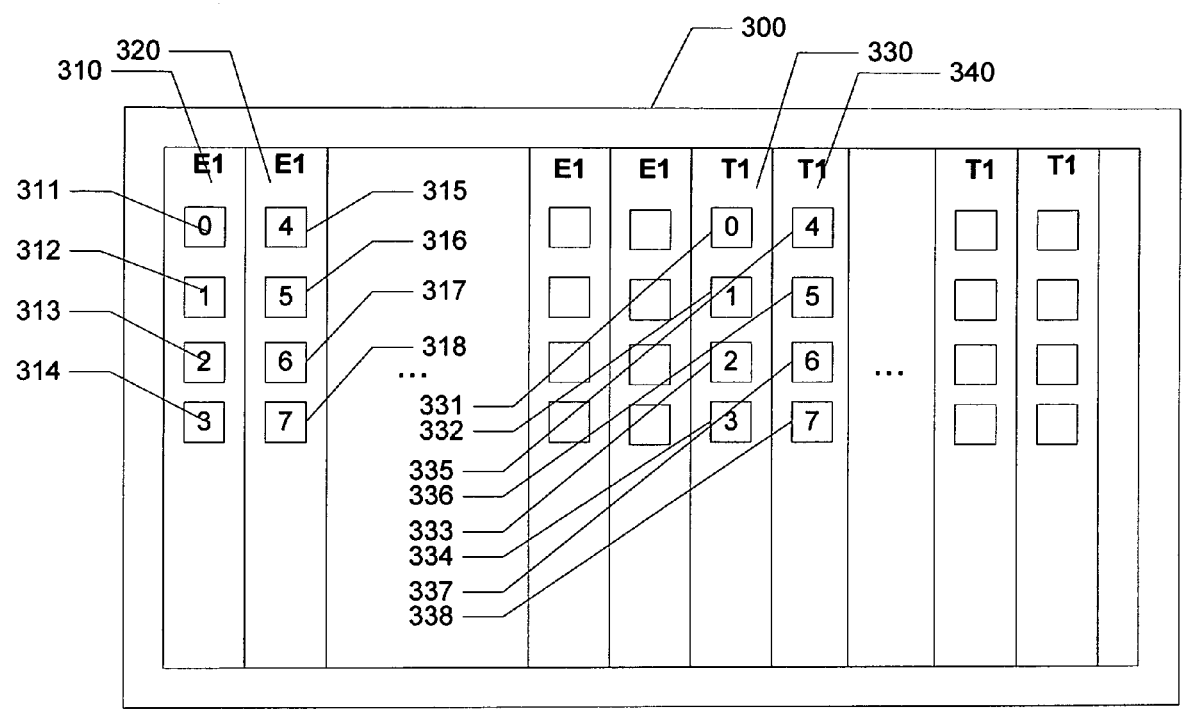
FIG. 2 is a diagram of a rear view of a chassis containing both E1 and T1 modules.

Referring now to FIG. 1, a diagram showing the configuration necessary to accomplish part of the present invention is shown. A first interface board, such as a T1 interface board is shown. The interface board includes an h.100 switch block 100, a local switch block 110, an HDLC 120, a Digital Signal Processor (DSP) 130 and four Framers 140, 150, 160 and 170. The data from Framer 140 (span 0) is fed into local switch block 110. The data leaves local switch block 110 and is provided to DSP 130. The output of DSP 130 is connected to another port of local switch block 110, which provides the signal back to Framer 140.

Framer 150 is similar to Framer 140 and signals from Framer 150 follow a similar path. The signal leaves Framer 150 and is received by local switch block 110. The signal exits local switch block 110 and is directed to DSP 130. From DSP 130 the signal travels back to local switch block 110 and from their back to Framer 140.

While prior to the presently disclosed invention framer 160 and 170 would be left idle, now they can be used. The signal exiting framer 160 goes to local switch block 110 and from there to H.100 switch block 100.

Beginning with the lines coming from the Framer span 2 160 and Framer span 3 170 of the Interface board 10, these lines are routed to the H.100 bus 30 through programmable switches labeled local switch block 110 and H.100 switch block 100. From the h.100 bus 30, at the Resource board 20, the lines are routed through programmable switches H.100 switch block 200 and local switch block 210 to DSP (60) 230 of the Resource board 20. From DSP (60) 230 of the Resource board 20, the lines are routed back through local switch block 210 and h.100 switch block 200 to the H.100 bus 30. From the H.100 bus 30, the lines are routed through the H.100 switch block 100 and the local switch block 110 of the interface board 10 and back to the Framer span 2 160 and Framer span 3 170. Accordingly, the DSP (60) 230 of the Resource board 20 is utilized by the interfaces 160 and 170 of the Interface board 10, thereby allowing for all four of the physical interfaces of the interface board to be utilized.

The present invention also required the ability to run protocols normally associated with T1 physical interfaces on a card with only E1 physical interfaces. Referring to FIG. 1, the physical interfaces (Framers 240, 250, 260, and 270) are independent of the DSP resources (DSP 230) used to implement the protocol on the interfaces; this invention took advantage of this fact and ran T1 protocols on DSP 230. It was further required that a method for changing the configuration from T1 to E1 and from E1 to T1 be provided. Logically this is done by switching the roles of the Interface Board (10) and the Resource Board (20) in FIG. 1. The software that initializes this application reads in the current switch configuration from a data file. This data file tells the software to either treat the system as a T1 system where the T1 interfaces will be used along with sharing the DSP from the E1 boards or to treat the system as a E1 system where the E1 interfaces will be used along with sharing the DSP from the T1 board. A simple GUI application was created for the user to choose which configuration file to use. Additionally, a method for configuring the system to look like a single set of contiguous T1 or E1 channels was developed, when in fact the hardware resources were not contiguous. This was done in software by presenting to the user a single set of either T1 or E1 test ports. This is important so the user of the system does not have to worry weather a given test port is active or not. Only active test ports are shown.

It was also desirable to provide a method for monitoring audio by switching the Pulse Code Modulate (PCM) audio streams from/to an audio enabled resource board and switching between listening to Mu-law encoded audio and A-law encoded audio (because T1 audio is usually Mu-law encoded and E1 audio is usually a-law encoded). The audio enabled resource board is able to receive either a-law encoded streams or Mu-law encodes streams but not both at once. Software was written to dynamically switch the audio board from Mu-law to a-law and vice versa. The software configures the audio board to be enabled for the correct encoding when the user switches from one configuration to the other.

The present invention also permits the system to be cabled as T1 and E1 at the same time. While the use of E1 or T1 interfaces was described the present invention could also be used with other interfaces including, but not limited to, T3 and E3.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A method of providing a multiple interface system comprising the steps of:

providing a first module having a first physical telecommunications interface and running a first telecommunications protocol, said first module having an H.100 switchblock in communication with said first telecommunications interface, a local switchblock in communication with said H.100 switchblock, a High-Level Data Link Control (HDLC) circuit in communication with said local switchblock, a digital signal processor in communication with said local switchblock and at least one framer in communication with said local switchblock;

providing a second module having a second physical telecommunications interface and capable of running a second telecommunications protocol which is different than said first telecommunications protocol, said second physical telecommunications interface being different from said first physical telecommunications interface, said second module running said first telecommunications protocol, said second module having a second H.100 switchblock in communication with said second telecommunications interface, a second local switchblock in communication with said second H.100 switchblock, a second HDLC circuit in communication with said second local switchblock, a second digital signal processor in communication with said second local switchblock and at least one second framer in communication with said second local switch block; and sharing a resource from said second module with said first module.

2. The method of claim 1 wherein said first physical telecommunications interface and said second physical telecommunications interface are selected from the group consisting of T1, E1, T3 and E3.

3. The method of claim 1 wherein said resource comprises a digital signal processor (DSP).

4. The method of claim 1 further comprising the step of providing a communications path between said first module and second module.

5. The method of claim 1 further comprising the step of changing a configuration of said system from one associated with said first physical telecommunications interface to one associated with said second physical telecommunications interface.

6. The method of claim 1 further comprising the step of making the interface channels appear contiguous across said first physical telecommunications interface and said second physical telecommunications interface.

7. The method of claim 1 wherein at least one of said first module and said second module comprise an audio enabled module.

8. The method of claim 7 wherein said first module and said second module utilize Pulse Code Modulated (PCM) audio streams.

9. The method of claim 8 wherein said PCM audio stream comprises an audio stream selected from the group comprising Mu-law encoded audio and A-law encoded audio.

10. A method of providing a multiple interface system comprising the steps of:
providing a first module having a first physical telecommunications interface, having a first H.100 switchblock in communication with said first telecommunications interface, a first local switchblock in communication with said first H.100 switchblock, a first High-Level Data Link Control HDLC circuit in communication with said first local switchblock, a first digital signal processor (DSP) in communication with said first local switchblock and at least one first framer in communication with said first local switchblock, and running a first telecommunications protocol;

providing a second module having a second physical telecommunications interface, a second H.100 switchblock in communication with said second telecommunications interface, a second local switchblock in communication with said second H.100 switchblock, a second HDLC circuit in communication with said second local switchblock, a second digital signal processor in communication with said second local switchblock and at least one second framer in communication with said second local switchblock, and capable of running a second telecommunications protocol which is different than said first telecommunications protocol, said second physical telecommunications interface being different from said first physical telecommunications interface, said second module running said first telecommunications protocol, wherein said first physical telecommunications interface and said second physical telecommunications interface are selected from the group consisting of T1, E1, T3 and E3, wherein at least one of said first module and said second module comprise an audio enabled module, wherein said first module and said second module utilize Pulse Code Modulated (PCM) audio streams, and wherein said PCM audio stream comprises an audio stream selected from the group comprising Mu-law encoded audio and A-law encoded audio;

sharing a resource from said second module with said first module, wherein said resource comprises said first digital signal processor;

providing a communications path between said first module and second module;

changing a configuration of said system from one associated with said first physical telecommunications interface to one associated with said second physical telecommunications interface; and making the interface channels appear contiguous across said first physical telecommunications interface and said second physical telecommunications interface.

* * * * *